(12) United States Patent
Markenzon et al.

(10) Patent No.: US 11,829,504 B2
(45) Date of Patent: Nov. 28, 2023

(54) DATA LOSS PREVENTION FRAMEWORK USING CLOUD INFRASTRUCTURE

(71) Applicant: Capital One Services, LLC, McLean, VA (US)

(72) Inventors: Aleksandr Markenzon, Falls Church, VA (US); Kyle Flaherty, Henrico, VA (US); Somkanti Biswas, Aldie, VA (US)

(73) Assignee: Capital One Services, LLC, McLean, VA (US)

(*) Notice: Subject to any disclaimer, the term of this patent is extended or adjusted under 35 U.S.C. 154(b) by 75 days.

(21) Appl. No.: 17/039,138

(22) Filed: Sep. 30, 2020

(65) Prior Publication Data

US 2022/0100886 A1 Mar. 31, 2022

(51) Int. Cl.
  *G06F 21/62* (2013.01)
  *H04L 67/10* (2022.01)

(52) U.S. Cl.
  CPC .......... *G06F 21/6227* (2013.01); *H04L 67/10* (2013.01)

(58) Field of Classification Search
  None
  See application file for complete search history.

(56) References Cited

U.S. PATENT DOCUMENTS

| | | |
|---|---|---|
| 10,063,654 B2 | 8/2018 | Kirti et al. |
| 10,291,657 B2 | 5/2019 | Narayanaswamy et al. |
| 11,159,419 B1* | 10/2021 | Roersma ............. H04L 63/0281 |
| 11,190,589 B1* | 11/2021 | Ron .................... H04L 63/0428 |
| 2018/0027006 A1* | 1/2018 | Zimmermann ..... H04L 63/0245 726/11 |
| 2019/0104118 A1 | 4/2019 | Wu et al. |
| 2019/0268381 A1* | 8/2019 | Narayanaswamy .. H04L 63/105 |
| 2020/0137097 A1 | 4/2020 | Zimmermann et al. |
| 2020/0242269 A1 | 7/2020 | Narayanaswamy |
| 2021/0026982 A1* | 1/2021 | Amarendran ....... G06F 21/6218 |

OTHER PUBLICATIONS

International Search Report and Written Opinion of the International Searching Authority directed to related International Patent Application No. PCT/US21/50407, dated Dec. 16, 2021; 16 pages.

* cited by examiner

*Primary Examiner* — June Sison
(74) *Attorney, Agent, or Firm* — Sterne, Kessler, Goldstein & Fox P.L.L.C.

(57) ABSTRACT

A system and method for data loss prevention (DLP) is disclosed, the system and method including at least: receiving, by one or more computing devices and from one or more remote sources, one or more data streams each containing a textual data; consolidating, by the one or more computing devices, the one or more data streams into a single data stream, wherein the single data stream includes a field indicating from which of the one or more remote sources the textual data for each of the one or more data streams originates; transmitting, by the one or more computing devices, the single data stream to an analytics engine; determining, with the analytics engine, whether the textual data of each of the one or more data streams contains a sensitive data using a reference table; and based on the determining, transmitting, by the one or more computing devices, a request to the one or more remote sources to delete the textual data.

20 Claims, 4 Drawing Sheets

DATA LOSS PREVENTION FRAMEWORK USING CLOUD INFRASTRUCTURE

TECHNICAL FIELD

Embodiments relate to systems and methods for data loss prevention (DLP), specifically DLP using a cloud infrastructure.

BACKGROUND

In the information driven economy, it is important to develop policies and technologies for mitigating loss of sensitive corporate and customer data. Moreover, the added legal and regulatory requirements to safeguard certain categories of data adds a greater urgency for developing technologies and techniques for data loss prevention (DLP). One issue faced in developing DLP technologies is how to uniformly treat data that is dispersed across multiple third-party platforms. The third-party platforms provide software and systems used by a company to generate the data. The third-party platforms are also often used to store the data. As a result, data is often controlled by third-parties and beyond the immediate control of the party that the data belongs to. As a result, techniques are needed to reassert control over the data and to better control the data and implement DLP policies.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the pertinent art to make and use the disclosure.

DETAILED DESCRIPTION

Figure 1:
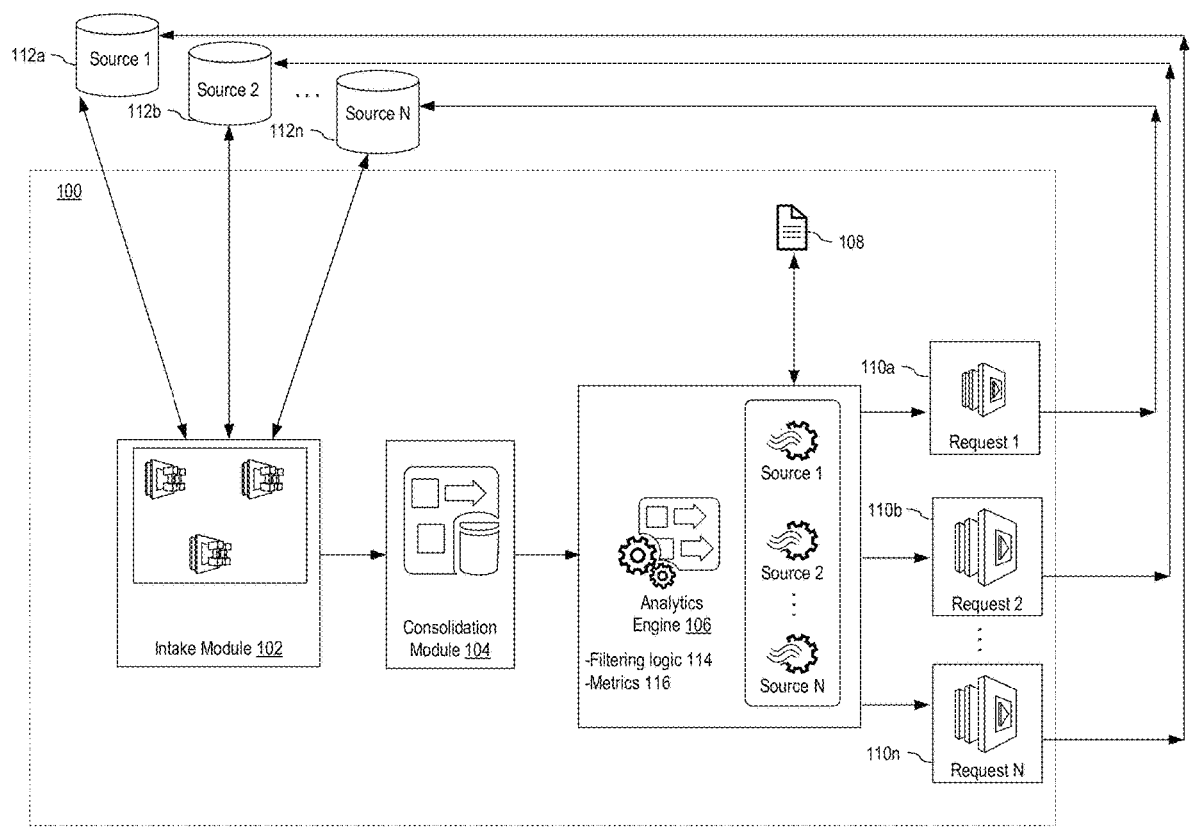
FIG. 1 is a system for data loss prevention in an embodiment of the present disclosure.

Embodiments disclosed herein provide a system and method for DLP. The system and method includes at least receiving, by one or more computing devices and from one or more remote sources, one or more data streams each containing a textual data. The system and method further includes consolidating, by the one or more computing devices, the one or more data streams into a single data stream, wherein the single data stream includes a field indicating from which of the one or more remote sources the textual data for each of the one or more data streams originates. The system and method further includes transmitting, by the one or more computing devices, the single data stream to an analytics engine. The system and method further includes determining, with the analytics engine, whether the textual data of each of the one or more data streams contains a sensitive data using a reference table. The system and method further includes transmitting based on the determining, by the one or more computing devices, a request to the one or more remote sources to delete the textual data.

The following embodiments are described in sufficient detail to enable those skilled in the art to make and use the disclosure. It is to be understood that other embodiments are evident based on the present disclosure, and that system, process, or mechanical changes may be made without departing from the scope of an embodiment of the present disclosure.

In the following description, numerous specific details are given to provide a thorough understanding of the disclosure. However, it will be apparent that the disclosure may be practiced without these specific details. In order to avoid obscuring an embodiment of the present disclosure, some well-known circuits, system configurations, architectures, and process steps are not disclosed in detail.

The drawings showing embodiments of the system are semi-diagrammatic, and not to scale. Some of the dimensions are for the clarity of presentation and are shown exaggerated in the drawing figures. Similarly, although the views in the drawings are for ease of description and generally show similar orientations, this depiction in the figures is arbitrary for the most part. Generally, the disclosure may be operated in any orientation.

The term "module" or "unit" referred to herein may include software, hardware, or a combination thereof in an embodiment of the present disclosure in accordance with the context in which the term is used. For example, the software may be machine code, firmware, embedded code, or application software. Also for example, the hardware may be circuitry, a processor, a special purpose computer, an integrated circuit, integrated circuit cores, a pressure sensor, an inertial sensor, a microelectromechanical system (MEMS), passive devices, or a combination thereof. Further, if a module or unit is written in the system or apparatus claims section below, the module or unit is deemed to include hardware circuitry for the purposes and the scope of the system or apparatus claims.

The modules or units in the following description of the embodiments may be coupled to one another as described or as shown. The coupling may be direct or indirect, without or with intervening items between coupled modules or units. The coupling may be by physical contact or by communication between modules or units.

System Overview and Function

FIG. 1 shows a system 100 for data loss prevention in an embodiment of the present disclosure. In one embodiment, the system 100 may be part of a backend computing infrastructure, including a server infrastructure of a company or institution. In one embodiment, the backend computing infrastructure may be implemented in a cloud computing environment. The cloud computing environment may be a public or private cloud service. Examples of a public cloud include Amazon Web Services (AWS), IBM Cloud, Oracle Cloud Solutions, Microsoft Azure Cloud, and Google Cloud, as examples. A private cloud refers to a cloud infrastructure similar to a public cloud with the exception that it is operated solely for a single organization.

In one embodiment, the system 100 may be implemented with modules and sub-modules. For example, the system 100 may include an intake module 102, a consolidation module 104, and an analytics engine 106. In one embodiment, the intake module 102 may be coupled to the consolidation module 104. The consolidation module 104 can further be coupled to the analytics engine 106.

The intake module 102 enables the receipt of one or more data streams from one or more remote sources 112. The remote sources 112 refer to databases or repositories, external to the system 100, that store data. In one embodiment, the data stored by the remote sources 112 may be a textual data. In FIG. 1, the remote sources 112 are indicated as {112a, 112b, ... 112n}. Any number of remote sources 112 may be interfaced with the intake module 102. The data streams refer to sequences of data received from the remote sources 112. Textual data refers to alpha-numeric data stored in text format. The textual data may be, for example, a chat file, a text file, transcripts, or similar text based data files.

In one embodiment, the remote sources 112 may be databases or repositories of third-party vendors that are connected to the system 100 via a software application. For example, in one embodiment, employees of the company or institution can use the software application of the third-party vendor to generate the textual data that may be stored on the remote sources 112. For example, in one embodiment, the remote sources 112 may be databases or repositories for software-as-a-service (SaaS) applications, such as Google Hangouts, Slack, Zoom, etc., that are maintained by the SaaS vendor. The employees of the company or institution can use the SaaS applications to generate the textual data by, for example, chatting in chat windows, creating text based messages, creating documents, creating posts, etc. The textual data may be saved on the remote sources 112.

Continuing with the example, in one embodiment, the intake module 102 can receive the data streams by, for example, interfacing with the remote sources 112 via application programming interfaces (APIs). The intake module 102 can use the APIs to request the textual data and receive the textual data via the data streams. In one embodiment, the intake module 102 can further request or enable the encryption of the textual data via the APIs prior to the textual data being transmitted to and received by the intake module 102. In one embodiment, upon receiving the data streams, the intake module 102 can transmit the data streams to a storage location for storage and later use, or can further transmit the data streams to the consolidation module 104 for further processing. For the purposes of discussion herein, it is assumed that the data streams are transmitted to the consolidation module 104.

The consolidation module 104 enables the consolidation or merging of the data streams into a single data stream. The consolidation module 104 may be implemented as a managed and scalable cloud computing service that allows for real-time intake and processing of data. For example, the consolidation module 104 may be implemented with, or as part of, a cloud computing service. Such a service may be, for example, the Amazon Kinesis platform or the Google Pub/Sub platform, as examples. Real-time refers to an instance where the consolidation or merging of the data streams is done near instantly from when they are received by the consolidation module 104. In one embodiment, the consolidation module 104 can generate the single data stream by multiplexing the data streams into the single data stream.

In one embodiment, the consolidation module 104 can, as a part of the consolidation or merging of the data streams, further generate one or more fields that add information to the single data stream. The fields refer to markers or headers, represented by bits or bytes of data, embedded within the single data stream that indicate further information regarding portions of the single data stream. For example, in one embodiment, the fields may be markers or headers indicating from which of the remote sources 112 the data streams, or the textual data associated with the data streams, originate. In another embodiment, the fields can indicate the size of the textual data associated with the data streams. The aforementioned are merely exemplary and not meant to be limiting. The fields may be used to represent any information about the data streams, as determined by an administrator or designer of the system 100. In this way, the fields can serve as delimiters in the single data stream.

For example, in one embodiment, if the fields are used to indicate from which of the remote sources 112 the data streams originate, the fields can include codes appended to the beginning or end of the data stream of each of the remote sources 112. For example, code "001" can represent the textual data originating from remote source 112a, code "010" can represent the textual data originating from remote source 112b, and "011" can represent textual data originating from remote source 112n, as examples. In this way, the data streams and textual data associated therewith may be mapped to their source. In another embodiment, the codes can be appended to beginning or end of the single data stream.

Continuing with the example, in one embodiment, once the consolidation module 104 generates the single data stream, the consolidation module 104 can further transmit the single data stream to the analytics engine 106. The analytics engine 106 enables the parsing and analysis of the single data stream to determine if the textual data associated with each of the data streams, that comprise the single data stream, contains sensitive data. Sensitive data refers to data that is to be protected against unauthorized access. For example, sensitive data can include personally identifiable information (PII), such as social security numbers, addresses, etc., or trade secret information.

In one embodiment, the analytics engine 106 may be implemented with, or as a part of, a cloud computing service. Such a service may be, for example, Amazon Kinesis Analytics and Insights, Google Cloud Dataflow, or Microsoft Stream Analytics, as examples. In one embodiment, the analytics engine 106 can perform its functions by decomposing or separating the single data stream back into its component parts (i.e., separating the single data stream back into the one or more data streams originally transmitted to the intake module 102). The purpose of this separation back into the data streams is to be able to analyze the textual data associated with the data streams and remote sources 112 separately and in parallel for faster processing and analysis of the textual data. A further purpose is to apply custom rules, if necessary, to textual data of each of the remote sources 112 to search for sensitive data.

In one embodiment, the analytics engine 106 can perform this decomposition or separation by using the fields generated by the consolidation module 104 and conditional statements implemented using a filtering logic 114 to search for the fields indicating from which of the remote sources 112 the textual data originated. Based on determining what textual data is associated with which of the remote sources 112, the analytics engine 106 can separate the textual data. In one embodiment, once the decomposition or separation is performed, the analytics engine 106 can further analyze the textual data for each of the data streams to determine if any of the textual data includes sensitive data.

In one embodiment, the analytics engine 106 can perform this analysis using the filtering logic 114 in conjunction with a reference table 108 to match keywords and/or regular expressions to the textual data to determine if the textual data contains sensitive data. The filtering logic 114 refers to computer logic, implemented using a query language and rules, and conditional statements to perform data lookup functions. The filtering logic 114 may be used to match the textual data associated with the data streams to one or more keywords or regular expressions to determine if the textual data contains sensitive data. In one embodiment, the filtering logic 114 may be implemented using a query language, such as Structured Query Language (SQL), as an example. The aforementioned is merely exemplary and not meant to be limiting.

The reference table 108 refers to a data structure, such as a table, containing the keywords and/or regular expressions used to match to the textual data. For example, the reference table 108 can contain keywords, such as "SOCIAL SECURITY", "ADDRESS", "PIN", etc., as examples. In one embodiment, the analytics engine 106 can parse the textual data and search for any of the keywords stored in the reference table 108 to determine if the textual data contains any of these keywords. If found, the analytics engine 106 can determine that the textual data contains sensitive data.

In one embodiment, the reference table 108, in addition to keywords, can further contain regular expressions that the analytics engine 106 can use to determine if the textual data contains sensitive data. For example, the analytics engine 106 can parse the textual data, and attempt to match the textual data to the regular expressions. The regular expressions refer to a sequence of symbols and characters expressing a string or pattern to be searched for within a longer piece of text, that indicates sensitive data. For example, the regular expression for a social security number may be "XXX-XX-XXXX". Thus, whenever a character string in the format "XXX-XX-XXXX" is encountered by the analytics engine 106, the analytics engine 106 can determine that the character string is a social security number. Based on matching the textual data to the keywords and/or regular expressions, the analytics engine 106 can determine if the textual data contains sensitive data.

In one embodiment, the reference table 108 may be maintained separately from the environment on which the system 100 is implemented. For example, if the system 100 is implemented on a cloud computing service, the reference table 108 may be stored and maintained separate from the cloud computing service. For example, the reference table 108 may be stored and maintained locally in a server located at the company or institution and may be referenced by the system 100 through API calls or accessed via hypertext links. In another embodiment, the reference table 108 may be stored or maintained within environment on which the system 100 is implemented. For example, the reference table 108 may be stored and maintained as a part of the cloud computing service on which the system 100 is implemented.

In one embodiment, the reference table 108 can contain customized keywords and/or regular expressions to be matched with by the analytics engine 106 for each of the remote sources 112. In this way, each of the remote sources 112 (i.e., each of the SaaS applications) can have a customizable set of keywords and/or regular expressions that may be used when the analytics engine 106 is searching for sensitive data. This is useful in instances where certain SaaS applications are used for certain functions and are known to contain only certain categories of sensitive data. For example, if one SaaS application is used for financial discussions within the company or institution, the keywords and/or regular expressions may be customized to search for sensitive data that is financial in nature. In this way, targeted searches may be performed for sensitive data based on the source of the data.

In one embodiment, based on determining that the textual data contains sensitive data, the analytics engine 106 can further generate and transmit a request 110 to the remote sources 112 to perform a task on the textual data. The request 110 can be in the form of a function call or a variable passed to a software function, a signal sent to a module, or a combination thereof. The task may be, for example, deletion of the textual data, encryption of the textual data, or a relocation of the textual data, as examples. The aforementioned are merely exemplary and not meant to be limiting. In FIG. 1, the requests are indicated as {110a, 110b, . . . 110n}, indicating a separate request 110 sent to each of the remote sources 112 to perform separate tasks on the sensitive data associated with each remote source. In one embodiment, the request 110 may be encrypted prior to the request 110 being transmitted to the remote sources 112.

In one embodiment, rather than generating and transmitting the request 110 to the remote sources 112 directly, the analytics engine 106 can generate and transmit the request 110 to a service of the cloud computing environment on which the system 100 is implemented, in order to have the service perform the task. The service may perform the task by, for example, implementing serverless functions to perform the tasks. The serverless functions may refer to anonymous functions of the cloud computing service that may be initiated or called to perform the task. The benefit of using serverless functions of the cloud computing environment is that the company or institution implementing the system 100 does not have to implement infrastructure, hardware, or software code to perform the task, and can rely on the cloud computing service to perform the task. Additionally, this relieves the company or institution of performing the administrative duties of managing the underlying compute resources for implementing the task. This simplifies the architecture and code implementations that the company or institution has to implement in designing and deploying the system 100.

The request 110 can be transmitted to the remote sources 112 or to the service of the cloud computing environment in real-time or as part of a batch process. The batch process refers to a process by which the request 110 is sent at a scheduled time. For example, in one embodiment if transmitting the request 110 in real-time, the analytics engine 106, upon generating the request 110, can transmit the request 110 to the remote sources 112 or the service of the cloud computing environment near instantaneously. If, however, the analytics engine 106 is transmitting the request 110 as part of a batch process, upon generating the request 110, the analytics engine 106 can store the request 110 in a storage location to be sent to the remote sources 112 or the service of the cloud computing environment at a scheduled time in the future.

In one embodiment, the analytics engine 106 can further generate one or more metrics 116. The metrics 116 refer to variables, parameters, or data indicating performance of one or more components of the system 100, or can indicate information about the data streams and/or the textual data associated with the data streams. For example, the metrics 116 can indicate the number of requests made by the system 100 to perform tasks on the remote sources 112, a count of the types of tasks to be performed, a count of ingested data streams over a period of time, or a count of how many times the analytics engine 106 has detected sensitive data, as examples. The aforementioned is merely exemplary and not meant to be limiting. Further metrics 116 may be generated by the analytics engine 106. The metrics 116 may be customized by an administrator or designer of the system 100. The metrics 116 allow the administrator or designer of the system 100 to determine how the system 100 is performing and further obtain insights about how much, on what platforms, and the extent to which sensitive data is disseminated across the systems and applications used by the company or institution.

Figure 2:
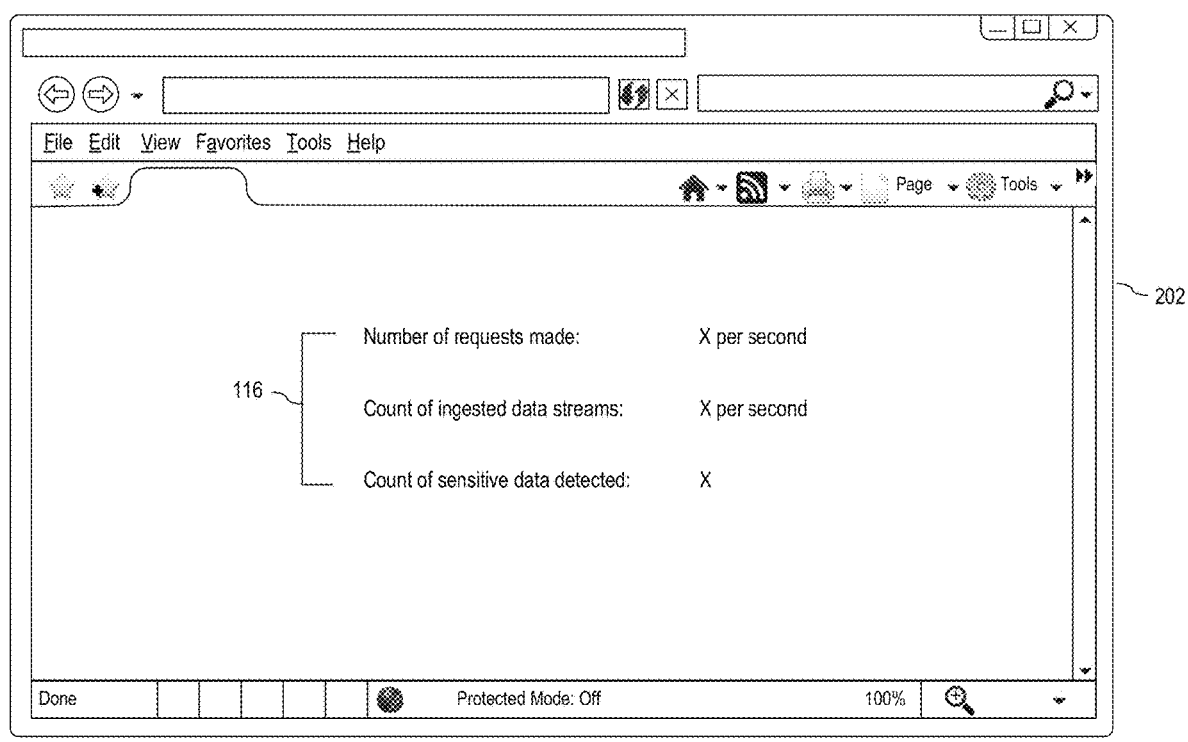
FIG. 2 is an example display interface for displaying metrics generated by the system in an embodiment of the present disclosure.

In one embodiment, the analytics engine 106 can transmit the metrics 116 for display on a display interface 202 (shown in FIG. 2). For example, in one embodiment, the analytics engine 106 can transmit the metrics 116 via the Internet to a webpage for visual display by the administrator or designer of the system 100. The metrics 116 can further be displayed in any manner that the system 100 is set up to display the metrics 116. For example, the metrics 116 may be displayed as lists, charts, etc.

FIG. 2 shows an example display interface 202 for displaying the metrics 116 generated by the system 100 in an embodiment of the present disclosure. In the embodiment shown in FIG. 2, the display interface 202 is a web interface and the metrics 116 are displayed in a web browser. In another embodiment, the metrics 116 may be displayed on a local system or displayed on a monitor, television, or other display device.

The modules described in FIG. 1 may be implemented as instructions stored on a non-transitory computer readable medium to be executed by one or more computing units such as a processor, a special purpose computer, an integrated circuit, integrated circuit cores, or a combination thereof. The non-transitory computer readable medium may be implemented with any number of memory units, such as a volatile memory, a nonvolatile memory, an internal memory, an external memory, or a combination thereof. The non-transitory computer readable medium may be integrated as a part of the system 100 or installed as a removable portion of the system 100.

It has been discovered that the processes and system 100 described above significantly improves the state of the art from previous systems because it introduces a novel way and architecture of setting up and managing a DLP system using a cloud computing infrastructure. The system 100 improves the state of the art by utilizing components of the cloud computing infrastructure to consolidate and merge data dispersed across multiple third-party applications (e.g., SaaS applications), and allows the funneling of this data through one pipeline. The consolidated data may be analyzed using a centrally implemented filtering logic 114, keywords, and regular expressions, to determine what data, if any, needs to be deleted, encrypted, relocated, etc., to better protect sensitive data from unauthorized access on third-party platforms.

It has been further discovered that the system 100 improves the art by setting up a centrally administered system to implement DLP policies. This centralization is achieved by the novel use of the analytics engine 106 and the reference table 108, which the company or institution can use to manage, using filtering logic 114 and the keywords and regular expressions, to implement the DLP policies across multiple third-party applications. This is an improvement over current systems because current systems for implementing DLP policies across third-party applications are set up separately for each of the third-party applications using separate infrastructure, code, and logic. The system 100 disclosed herein provides an architecture which consolidates all these systems and provides a way, via the reference table 108 and analytics engine 106 to centrally manage the code, hardware, and/or rules implementing DLP policies for each of the third-party applications.

It has been further discovered that the system 100 improves the art by reducing the cost of implementing DLP systems because the system 100 allows for a single set up of infrastructure that may be scaled and integrated with any number of third-party applications to implement DLP policies. It has been further discovered that the system 100 improves the art by simplifying the set up of DLP systems by companies or institutions because it utilizes cloud computing resources such as serverless functions to implement the DLP policy tasks on sensitive data. In this way, the company or institution does not have to implement the code itself and can offload some of the functionality of the system 100 to the cloud computing infrastructure on which the system 100 is implemented.

Methods of Operation

Figure 3:
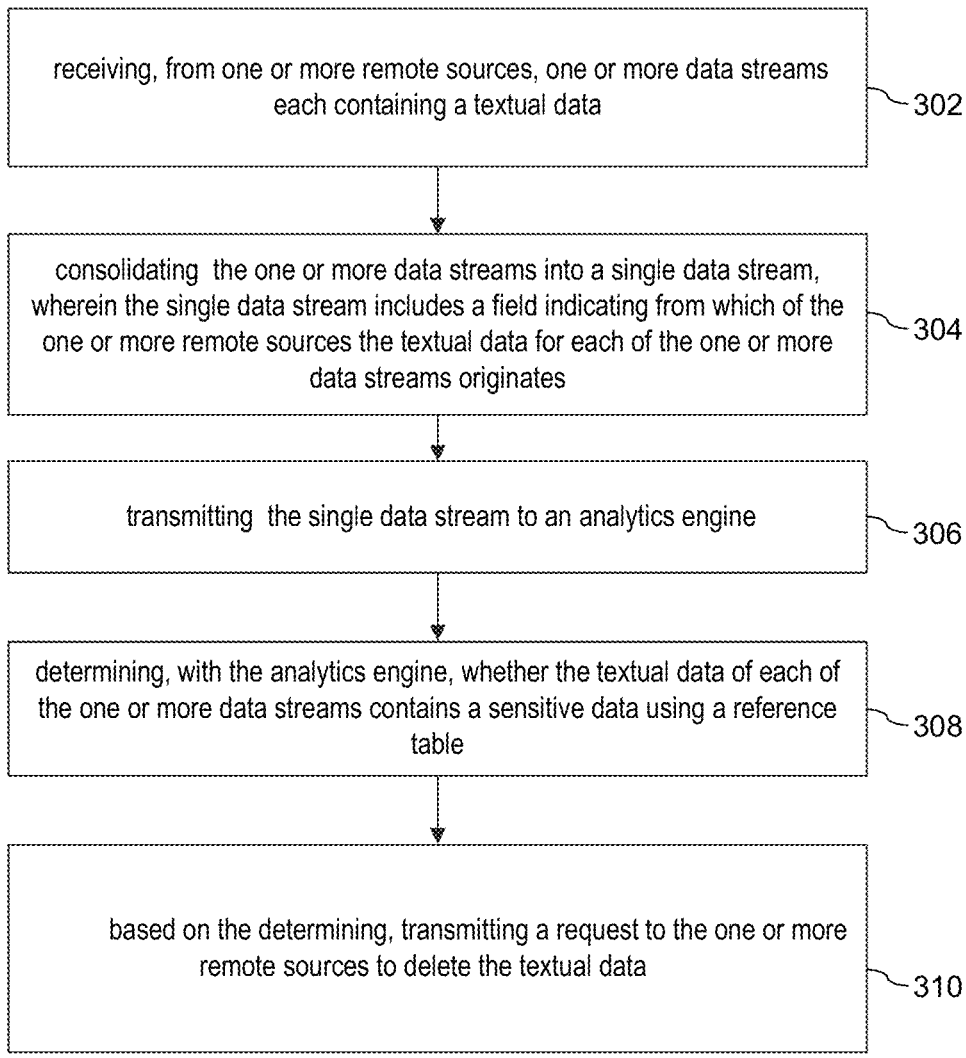
FIG. 3 is an example method of operating the system in an embodiment of the present disclosure.

FIG. 3 shows an example method 300 of operating the system 100 in an embodiment of the present disclosure. The method 300 includes receiving, from one or more remote sources 112, one or more data streams each containing a textual data, as shown in 302. The method 300 further includes consolidating the one or more data streams into a single data stream, wherein the single data stream includes a field indicating from which of the one or more remote sources 112 the textual data for each of the one or more data streams originates, as shown in 304. The method 300 further includes transmitting the single data stream to an analytics engine 106, as shown in 306. The method 300 further includes determining, with the analytics engine 106, whether the textual data of each of the one or more data streams contains a sensitive data using a reference table 108, as shown in 308. The method 300 further includes, based on the determining, transmitting a request 110 to the one or more remote sources 112 to delete the textual data, as shown in 310. The operations of method 300 are performed, for example, by system 100, in accordance with embodiments described above.

Components of the System

Figure 4:
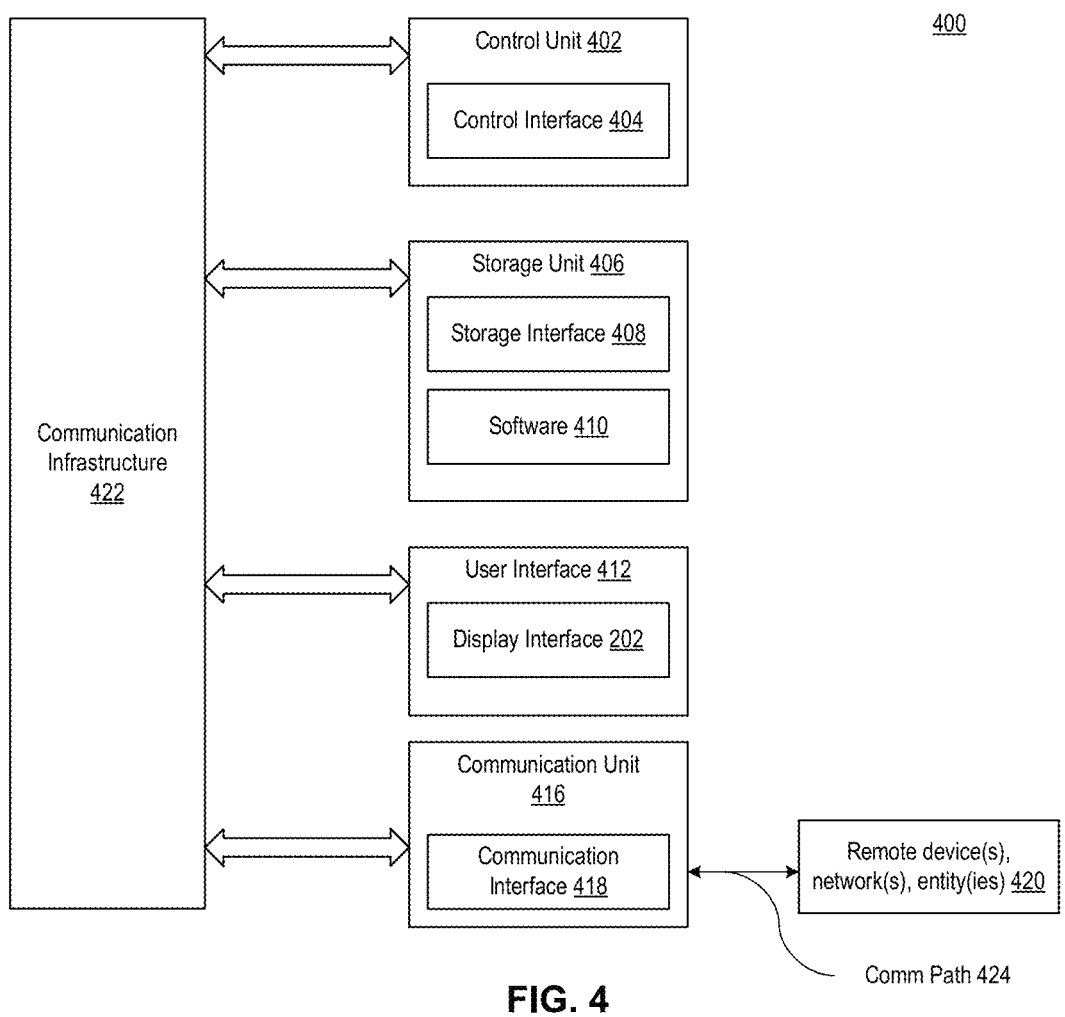
FIG. 4 is an example architecture of the components implementing the system in an embodiment of the present disclosure.

FIG. 4 is an example architecture 400 of the components implementing the system 100 in an embodiment of the present disclosure. In one embodiment, the components may include a control unit 402, a storage unit 406, a communication unit 416, and a user interface 412. The control unit 402 may include a control interface 404. The control unit 402 may execute a software 410 to provide some or all of the intelligence of the system 100. The control unit 402 may be implemented in a number of different ways. For example, the control unit 402 may be a processor, an application specific integrated circuit (ASIC), an embedded processor, a microprocessor, a hardware control logic, a hardware finite state machine (FSM), a digital signal processor (DSP), a field programmable gate array (FPGA), or a combination thereof.

The control interface 404 may be used for communication between the control unit 402 and other functional units or devices of the system 100. The control interface 404 may also be used for communication that is external to the functional units or devices of the system 100. The control interface 404 may receive information from the functional units or devices of the system 100, or from remote devices 420, or may transmit information to the functional units or devices of the system 100 or to remote devices 420. The remote devices 420 refer to units or devices external to the system 100.

The control interface 404 may be implemented in different ways and may include different implementations depending on which functional units or devices of the system 100 or remote devices 420 are being interfaced with the control unit 402. For example, the control interface 404 may be implemented with a pressure sensor, an inertial sensor, a microelectromechanical system (MEMS), optical circuitry, waveguides, wireless circuitry, wireline circuitry to attach to a bus, an application programming interface, or a combination thereof. The control interface 404 may be connected to a communication infrastructure 422, such as a bus, to interface with the functional units or devices of the system 100 or remote devices 420.

The storage unit 406 may store the software 410. For illustrative purposes, the storage unit 406 is shown as a single element, although it is understood that the storage unit 406 may be a distribution of storage elements. Also for illustrative purposes, the storage unit 406 is shown as a single hierarchy storage system, although it is understood that the storage unit 406 may be in a different configuration. For example, the storage unit 406 may be formed with different storage technologies forming a memory hierarchical system including different levels of caching, main memory, rotating media, or off-line storage. The storage unit 406 may be a volatile memory, a nonvolatile memory, an internal memory, an external memory, or a combination thereof. For example, the storage unit 406 may be a nonvolatile storage such as nonvolatile random access memory (NVRAM), Flash memory, disk storage, or a volatile storage such as static random access memory (SRAM) or dynamic random access memory (DRAM). The remote sources 112 may be implemented with the same technologies as the storage unit 406.

The storage unit 406 may include a storage interface 408. The storage interface 408 may be used for communication between the storage unit 406 and other functional units or devices of the system 100. The storage interface 408 may also be used for communication that is external to the system 100. The storage interface 408 may receive information from the other functional units or devices of the system 100 or from remote devices 420, or may transmit information to the other functional units or devices of the system 100 or to remote devices 420. The storage interface 408 may include different implementations depending on which functional units or devices of the system 100 or remote devices 420 are being interfaced with the storage unit 406. The storage interface 408 may be implemented with technologies and techniques similar to the implementation of the control interface 404.

The communication unit 416 may enable communication to devices, components, modules, or units of the system 100 or to remote devices 420. For example, the communication unit 416 may permit the system 100 to communicate with the remote sources 112, the display interface 202, or to transmit data to and from the various modules of the system 100. The communication unit 416 may further permit the devices of the system 100 to communicate with remote devices 420 such as an attachment, a peripheral device, or a combination thereof through a communication path 424, such as a wireless or wired network.

The communication path 424 may span and represent a variety of networks and network topologies. For example, the communication path 424 may be a part of a network and include wireless communication, wired communication, optical communication, ultrasonic communication, or a combination thereof. For example, satellite communication, cellular communication, Bluetooth, Infrared Data Association standard (IrDA), wireless fidelity (WiFi), and worldwide interoperability for microwave access (WiMAX) are examples of wireless communication that may be included in the communication path 424. Cable, Ethernet, digital subscriber line (DSL), fiber optic lines, fiber to the home (FTTH), and plain old telephone service (POTS) are examples of wired communication that may be included in the communication path 424. Further, the communication path 424 may traverse a number of network topologies and distances. For example, the communication path 424 may include direct connection, personal area network (PAN), local area network (LAN), metropolitan area network (MAN), wide area network (WAN), or a combination thereof.

The communication unit 416 may also function as a communication hub allowing the system 100 to function as part of the communication path 424 and not be limited to be an end point or terminal unit to the communication path 424. The communication unit 416 may include active and passive components, such as microelectronics or an antenna, for interaction with the communication path 424.

The communication unit 416 may include a communication interface 418. The communication interface 418 may be used for communication between the communication unit 416 and other functional units or devices of the system 100 or to remote devices 420. The communication interface 418 may receive information from the other functional units or devices of the system 100, or from remote devices 420, or may transmit information to the other functional units or devices of the system 100 or to remote devices 420. The communication interface 418 may include different implementations depending on which functional units or devices are being interfaced with the communication unit 416. The communication interface 418 may be implemented with technologies and techniques similar to the implementation of the control interface 404.

The user interface 412 may present information generated by the system 100. In one embodiment, the user interface 412 allows a user of the system 100 to interface with the devices of the system 100 or remote devices 420. The user interface 412 may include an input device and an output device. Examples of the input device of the user interface 412 may include a keypad, buttons, switches, touchpads, soft-keys, a keyboard, a mouse, or any combination thereof to provide data and communication inputs. Examples of the output device may include a display interface 202. The control unit 402 may operate the user interface 412 to present information generated by the system 100. The control unit 402 may also execute the software 410 to present information generated by the system 100, or to control other functional units of the system 100. The display interface 202 may be any graphical user interface such as a display, a projector, a video screen, or any combination thereof.

The above detailed description and embodiments of the disclosed system 100 are not intended to be exhaustive or to limit the disclosed system 100 to the precise form disclosed above. While specific examples for the system 100 are described above for illustrative purposes, various equivalent modifications are possible within the scope of the disclosed system 100, as those skilled in the relevant art will recognize. For example, while processes and methods are presented in a given order, alternative implementations may perform routines having steps, or employ systems having processes or methods, in a different order, and some processes or methods may be deleted, moved, added, subdivided, combined, or modified to provide alternative or sub-combinations. Each of these processes or methods may be implemented in a variety of different ways. Also, while processes or methods are at times shown as being performed in series, these processes or blocks may instead be performed or implemented in parallel, or may be performed at different times.

The resulting method, process, apparatus, device, product, and system 100 is cost-effective, highly versatile, and accurate, and may be implemented by adapting components for ready, efficient, and economical manufacturing, application, and utilization. Another important aspect of the embodiments of the present disclosure is that it valuably supports and services the historical trend of reducing costs, simplifying systems, and increasing performance.

These and other valuable aspects of the embodiments of the present disclosure consequently further the state of the technology to at least the next level. While the disclosed embodiments have been described as the best mode of implementing the system 100, it is to be understood that many alternatives, modifications, and variations will be apparent to those skilled in the art in light of the descriptions herein. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A computer implemented method for data loss prevention, the method comprising:
    (a) receiving, by one or more computing devices and from one or more remote sources, one or more data streams each containing a textual data;
    (b) consolidating, by the one or more computing devices, the one or more data streams into a single data stream, wherein the single data stream includes a field indicating from which of the one or more remote sources the textual data for each of the one or more data streams originates;
    (c) transmitting, by the one or more computing devices, the single data stream to an analytics engine;
    (d) determining, with the analytics engine, whether the textual data of each of the one or more data streams contains a sensitive data using a reference table, wherein the reference table is a data structure storing keywords and regular expressions custom to each of the one or more remote sources and used to match to the textual data; and
    (e) based on the determining in (d), transmitting, by the analytics engine and in real-time after it is determined that the one or more data streams contains the sensitive data, a request to the one or more remote sources to delete the textual data.

2. The computer implemented method of claim 1, wherein the determining in (d) is performed by applying a filtering logic, wherein the filtering logic matches one or more keywords or one or more regular expressions to the textual data.

3. The computer implemented method of claim 2, wherein the filtering logic is implemented with a query language.

4. The computer implemented method of claim 2, wherein the one or more keywords and the one or more regular expressions are customizable for each of the one or more remote sources.

5. The computer implemented method of claim 1, wherein the transmitting in (e) is performed by transmitting the request to a serverless function of a cloud computing service to delete the textual data.

6. The computer implemented method of claim 1, further comprising:
    generating, by the one or more computing devices, one or more metrics based on the determining in (d); and
    transmitting, by the one or more computing devices, the one or more metrics for display on a display interface.

7. The computer implemented method of claim 1, wherein (a)-(e) are implemented in a cloud computing service.

8. A non-transitory computer readable medium including instructions for a computing system for data loss prevention, the instructions comprising:
    (a) receiving, by one or more computing devices and from one or more remote sources, one or more data streams each containing a textual data;
    (b) consolidating, by the one or more computing devices, the one or more data streams into a single data stream, wherein the single data stream includes a field indicating from which of the one or more remote sources the textual data for each of the one or more data streams originates;
    (c) transmitting, by the one or more computing devices, the single data stream to an analytics engine;
    (d) determining, with the analytics engine, whether the textual data of each of the one or more data streams contains a sensitive data using a reference table, wherein the reference table is a data structure storing keywords and regular expressions custom to each of the one or more remote sources and used to match to the textual data; and
    (e) based on the determining in (d), transmitting, by the analytics engine and in real-time after it is determined that the one or more data streams contains the sensitive data, a request to the one or more remote sources to delete the textual data.

9. The non-transitory computer readable medium of claim 8, wherein the determining in (d) is performed by applying a filtering logic, wherein the filtering logic matches one or more keywords or one or more regular expressions to the textual data.

10. The non-transitory computer readable medium of claim 9, wherein the filtering logic is implemented with a query language.

11. The non-transitory computer readable medium of claim 9, wherein the one or more keywords and the one or more regular expressions are customizable for each of the one or more remote sources.

12. The non-transitory computer readable medium of claim 8, wherein the transmitting in (e) is performed by transmitting the request to a serverless function of a cloud computing service to delete the textual data.

13. The non-transitory computer readable medium of claim 8, the instructions further comprising:
    generating, by the one or more computing devices, one or more metrics based on the determining in (d); and
    transmitting, by the one or more computing devices, the one or more metrics for display on a display interface.

14. The non-transitory computer readable medium of claim 8, wherein (a)-(e) are implemented in a cloud computing service.

15. A computing system for data loss prevention comprising:
    a memory storing instructions;
    a communication unit including microelectronics, coupled to the memory and configured to process the instructions to:
        (a) receive, from one or more remote sources, one or more data streams each containing a textual data; and
    a processor, coupled to the memory and configured to process the instructions to:

(b) consolidate the one or more data streams into a single data stream, wherein the single data stream includes a field indicating from which of the one or more remote sources the textual data for each of the one or more data streams originates, (c) determine whether the textual data of each of the one or more data streams contains a sensitive data using a reference table, wherein the reference table is a data structure storing keywords and regular expressions custom to each of the one or more remote sources and used to match to the textual data, (d) based on the determining in (c), generate a request to the one or more remote sources to delete the textual data; and wherein the communication unit is further configured to
(e) transmit in real-time after it is determined that the one or more data streams contains the sensitive data, the request to the one or more remote sources to delete the textual data.

16. The computing system of claim 15, wherein the processor is further configured to determine in (c) based on applying a filtering logic, wherein the filtering logic matches one or more keywords or one or more regular expressions to the textual data.

17. The computing system of claim 16, wherein the filtering logic is implemented with a query language.

18. The computing system of claim 16, wherein the one or more keywords and the one or more regular expressions are customizable for each of the one or more remote sources.

19. The computing system of claim 15, wherein the communication unit is further configured to transmit the request to a serverless function of a cloud computing service to delete the textual data.

20. The computing system of claim 15, wherein:

the processor is further configured to generate one or more metrics based on the determining in (c); and the communication unit is further configured to transmit the one or more metrics for display on a display interface.

* * * * *